United States Patent Office 2,757,170
Patented July 31, 1956

2,757,170

PROCESS OF RECOVERING ROSIN FROM RESINOUS WOOD

George H. Cook, Jr., Brunswick, Ga., assignor to Hercules Powder Company, Wilmington, Del., a corporation of Delaware No Drawing. Application July 9, 1953,
Serial No. 367,081

13 Claims.  (Cl. 260—110)

This invention relates to an extraction process and more particularly to an improved method for extracting resinous materials from wood.

It is known that pine wood may be extracted with a coal tar hydrocarbon such as benzene, and other types of solvents have also been used for this purpose. None of the solvents heretofore utilized, however, has been entirely satisfactory from an efficiency standpoint, and some of the prior art extraction solvents have had other disadvantages as well. For example, when pine wood is extracted with certain solvents, for example, acetone, and the "drop liquor," as the resulting extract solution is called, is evaporated there is formed an insoluble thermosetting precipitate which adheres to the walls of the distillation apparatus, thereby reducing efficiencies and finally necessitating work stoppage for dismantling and cleaning. There has been a need for an extraction process which would permit greater efficiency in removal of resin from wood and which would not have the unfavorable characteristics of the prior art processes.

In accordance with this invention, resin is extracted from pine wood by treating the resinous wood with a ketone containing at least five but not more than nine carbon atoms. The ketone may be acyclic or alicyclic. Exemplary ketones operable in this invention are methyl isobutyl ketone, diethyl ketone, methyl isopropyl ketone, diisobutyl ketone, cyclohexanone, mesityl oxide and acetyl acetone. Of these ketones, methyl isobutyl ketone is outstanding as a pine wood extractant and is the preferred species of ketone. The extraction process of this invention produces an increased yield of resin from wood ranging up to 50 lbs. per ton of wood depending upon particular extraction conditions employed and the concentration of resin in the original wood.

In carrying out the process of this invention, pine wood chips, preferably from the Southern long leaf pine in the form of stump wood, root or "top" wood, are extracted with a ketone such as, for example, methyl isobutyl ketone until extraction is substantially completed. Pine wood may be steamed before extraction with the ketone or the extraction may be carried out without previous steaming of the wood. The ketone removes from the pine wood, rosin and other resinous materials and where the pine wood has not been previously steamed, turpentine and pine oil will also be extracted. The extract solution is then distilled to remove the solvent ketone and then turpentine and pine oil, if present, are also distilled off leaving a residue of pine wood resin. The constituents of pine wood resin may be isolated and refined by well known means.

The ketone solvents of this invention represent a substantial improvement over prior art solvents as resinous wood extractants. For example, when acetone is used to extract resin and the extract evaporated to remove acetone, extracting and distilling apparatus constructed of materials customarily utilized are excessively corroded rendering the process commercially unfeasible. Also, evaporation of an acetone extract of pine wood resin results in fouling of distillation apparatus in that an insoluble thermosetting precipitate forms on the walls of the apparatus. As a consequence distillation efficiency is reduced and dismantling and cleaning is mandatory. Another disadvantage of acetone as a resin extractant arises from the fact that acetone, in addition to removing desirable resins from the resinous wood, also removes many undesirable materials such as sugars, acids, and aldehydes, thereby rendering very difficult the production of certain products. In contrast, the ketone solvents of this invention do not corrode equipment, do not foul the distillation apparatus by precipitation, and produce typical naval store products.

The extracting power of the ketone solvents of this invention substantially exceeds that of aromatic hydrocarbon solvents. For example, pine wood chips containing 25% water by weight extracted with benzene at 95 p. s. i. g. pressure and 129° C. produced a yield of 422 lbs. resin per ton of wood whereas under similar conditions comparable chips extracted with methyl isobutyl ketone produced 451 lbs. resin per ton of wood. In some instances, even greater yields have been obtained using certain ketones of this invention and in no instance was the distilling apparatus found to be fouled when the extract solution was evaporated.

Table 1 shows results of extracting pine wood with ketone solvents of this invention compared with results obtained using benzene:

Table I

| Wood Batch | Particle Size | Percent $H_2O$ | Temperature, °C. | Pressure, p. s. i. g. | Solvent | Yield, lbs. per ton dry wood | Analysis of Extract | | |
|---|---|---|---|---|---|---|---|---|---|
| | | | | | | | Acid No. | Melting Point, °C. | Percent Gasoline Insoluble |
| 55a | Ground | 20 | 70 | Atmospheric | Benzene | 625 | 151 | 81 | 11.5 |
| 55a | do | 20 | | 20 Inches Hg Vacuum | Cyclohexanone | 661 | 147 | 83 | 17.2 |
| 55a | do | 20 | 85 | Atmospheric | Methyl Isopropyl Ketone | 657 | 147 | 81 | 15.8 |
| 55a | do | 20 | 88 | do | Diethyl Ketone | 650 | 150 | 82 | 13.9 |

In carrying out the process of this invention, any convenient conditions of temperature and pressure may be utilized. It is desirable, however, to use temperatures ranging from 80° C. to 175° C. and pressures of atmospheric to 125 p. s. i. g. For commercial practices, it is preferred to use temperatures of 90° C. to 150° C. and pressures of 0 to 95 p. s. i. g. In general, the smaller the chip size of the resinous wood, the more moderate may be the extraction conditions.

Methyl isobutyl ketone is the preferred species of ketone in this invention because of its substantially superior characteristics as a pine wood extractant. While the other ketones of this invention are markedly superior to the best prior art pine wood extractants, namely benzene and toluene, none possesses all the unique advantages of methyl isobutyl ketone. Because of its relatively high vapor pressure, higher flash point, lower toxicity and greater water solubility as compared with benzene and toluene, methyl isobutyl ketone represents a great improvement over either of the latter in the extraction of resin from pine wood. The higher flash point and lower toxicity provide greater safety for operating personnel. The higher vapor pressure of methyl isobutyl ketone permits efficient operation at much lower pressures than with prior art solvents.

Because methyl isobutyl ketone is more soluble in water than benzene, the practice of this invention differs from prior art processes in that there is no necessity for the resinous wood to have a low moisture content. The advantages of this invention may be obtained using wood containing upwards of 30% moisture content by weight. Usually wood "as processed" contains from 15 to 25% moisture by weight. Notwithstanding the higher moisture content of the wood chips, however, it has been found that the spent wood, produced as a by-product in the process of this invention, has a lower moisture content than spent wood obtained by prior art processes. The spent wood resulting from the practice of this invention, therefore, is more useful and valuable as fuel.

The ketone solvents of this invention possess higher penetrability than prior art solvents such as benzene. This characteristic of the invention permits more complete extraction of resin and also allows extraction of chips larger in size than heretofore possible without loss of yields. Consequently, grinding of chips to the small size found essential in the art is not necessary and further savings in time and labor are effected. The substantially higher penetrability of methyl isobutyl ketone as compared with benzene is illustrated by the data in Table II. To obtain this data one-inch cubes of a pine wood sample containing 856 lb./ton resin were extracted at atmospheric pressure under comparable conditions.

*Table II*

| Wood Batch | Particle Size | Percent $H_2O$ | Temp., °C. | Press. | Solvent | Yield, lb./ton fresh wood | Efficiency, percent |
|---|---|---|---|---|---|---|---|
| A | 1-in. cube | 6 | 90 | Atmos. | MIBK | 819 | 95.7 |
| A | do | 6 | reflux | do | Benzene | 458 | 53.5 |

Still another advantage of the process of this invention over prior art processes attaches to the refinability of the rosin extracted. Lighter colored rosins are more easily attainable when pine wood is extracted with the ketone solvents of this invention. It has been found that resinous pine wood from certain localities and also certain types of wood, when extracted with benzene, do not produce light colored rosin products. When this same wood is extracted with, for example, methyl isobutyl ketone, a rosin of a WW color can be easily obtained using customary refining techniques.

The process of the invention can be utilized in either a batch or continuous operation and is suitable for countercurrent extraction techniques. In the latter type of operation, a quantity of wood is passed through a number of extraction stages and treated in each stage with, for example, a portion of methyl isobutyl ketone. The extract solutions are maintained separate from one another. The extract solution from stage 1 is directly distilled, following removal of any water layer present to recover solvent and resin. The extract solution from stage 2 is used to extract resins from the fresh batch of wood chips entering stage 1 and the extract solution from each of the remaining stages is used as extractant in each of the preceding stages (based on the flow of wood chips through the operation). In the last stage of wood chip treatment, fresh methyl isobutyl ketone is used as extractant. In this manner, maximum utilization of the extracting power of the ketone is obtained, in that the ketone having the greatest extracting power contacts wood least rich in resin, and solvent mixture having the least extracting power (i. e., being richest in resin) contacts wood richest in resin. By operating in this manner equilibrium conditions may be maintained and the most efficient use of solvent achieved.

Although it is preferred to carry out this invention using a ketone of this invention as sole extractant, mixtures of these ketones may also be utilized effectively. In addition, the invention may be practiced using a ketone of this invention admixed with a small amount of another solvent such as benzene, acetone, toluene, paraffin hydrocarbon, etc. The added solvent in such instances should not be present in greater than minor amounts nor in amounts large enough to diminish substantially the desirable attributes of the ketone used.

What I claim and desire to protect by Letters Patent is:
1. In the process of recovering rosin from resinous wood the step comprising extracting the wood with a ketone containing at least five but not more than nine carbon atoms.
2. In the process of recovering rosin from resinous wood the step comprising extracting the wood with a ketone selected from the group consisting of diethyl ketone, methyl isopropyl ketone, methyl isobutyl ketone, diisobutyl ketone, cyclohexanone, mesityl oxide, acetyl acetone and mixtures thereof.
3. The process of claim 2 in which the ketone is diethyl ketone.
4. The process of claim 2 in which the ketone is methyl isopropyl ketone.
5. The process of claim 2 in which the ketone is methyl isobutyl ketone.
6. The process of claim 2 in which the ketone is diisobutyl ketone.
7. The process of claim 2 in which the ketone is cyclohexanone.
8. In the process of recovering rosin from resinous wood the step comprising extracting the wood with a ketone selected from the group consisting of diethyl ketone, methyl isopropyl ketone, methyl isobutyl ketone, diisobutyl ketone, cyclohexanone, mesityl oxide, acetyl acetone and mixtures thereof at a temperature of 80–175° C. and a pressure of 0–125 p. s. i. g.
9. The process of claim 8 in which the ketone is diethyl ketone.
10. The process of claim 8 in which the ketone is methyl isopropyl ketone.
11. The process of claim 8 in which the ketone is methyl isobutyl ketone.
12. The process of claim 8 in which the ketone is diisobutyl ketone.
13. The process of claim 8 in which the ketone is cyclohexanone.

References Cited in the file of this patent

UNITED STATES PATENTS

| Re. 19,749 | Bent | Nov. 12, 1935 |
| 2,423,020 | Haun | June 24, 1947 |
| 2,424,628 | Palmer | July 29, 1947 |